United States Patent Office 2,831,860
Patented Apr. 22, 1958

2,831,860

PROCESS FOR THE MANUFACTURE OF VAT DYE-STUFFS OF THE INDANTHRONE SERIES

Paul Sutter and Walter Fioroni, Binningen, Switzerland, assignors to Ciba Limited, Basel, Switzerland, a Swiss firm No Drawing. Application November 18, 1954
Serial No. 469,826

Claims priority, application Switzerland
December 11, 1953

8 Claims. (Cl. 260—263)

The ordinary commercial process for the manufacture of vat dyestuffs of the indanthrone series, especially indanthrone itself, uses 2-aminoanthraquinones as starting materials and is conducted in a caustic potash melt. In British Patents Nos. 5,959/1906 and 703,377 are described processes in which 1-aminoanthraquinones are subjected to fusion in an alkali metal phenolate with the addition of an oxidizing agent.

The present invention is based on the observation that vat dyestuffs of the indanthrone series can be made with advantage by subjecting 1-aminoanthraquinones to fusion with a small proportion of an alkali metal phenolate in the presence of an oxidizing agent, by maintaining in the melt a distillable liquid constituent in sufficiently high concentration to keep the melt in a stirrable condition.

In the present process there is advantageously used 1-aminoanthraquinone itself. When substituted 1-aminoanthraquinones are used the relatively severe reaction conditions often lead to the elimination of, or undesired change in, the substituents. By "a small proportion" of an alkali metal phenolate there is meant herein a proportion which is insufficient to yield a satisfactory melt throughout the reaction period without special measures being taken, for example, a proportion of an alkali metal phenolate not exceeding three to four times the weight of the 1-aminoanthraquinone used. As alkali metal phenolates there may be used in the present process not only the alkali metal salts, for example, the sodium or more especially the potassium salt, of phenol itself but also the corresponding salts of substituted phenols, for example, of para, meta- or especially ortho-cresol. As oxidizing agents there may be used, for example, alkali metal nitrates, persulfates, perborates, alkali metal chlorates and also manganese dioxide, the presence of manganese dioxide or ferric oxide together with another oxidizing agent, such for example as a chlorate, in some cases leading to a favorable result.

For reasons of economy it is desirable to use for preparing the melt as small a proportion of alkali metal phenolate as possible, for example, 1 part of aminoanthraquinone to only about 1.5 parts of phenol. In diminishing the proportion of the phenolate a point is reached at which the melt can no longer be stirred at all or not satisfactorily. Under these conditions there is not only the risk of the reaction proceeding non-uniformly, but there is a risk of explosion, especially when a chlorate, which is otherwise advantageous, is used. This risk is avoided by the present process, which also gives excellent yields.

Thus, it has been unexpectedly found that a melt of the above kind remains in a stirrable condition if it contains a sufficiently high concentration of a distillable liquid constituent. As liquid constituents there are advantageously used those which form part of the reaction mixture, for example, phenol and especially water, or both together.

In the aforesaid British Patent No. 703,377 and in the corresponding French Patent No. 1,051,407 it is expressly stated that neither the phenol nor the potassium hydroxide should be present in excess in the melt, it being, of course, necessary in determining the point of stoichiometric equivalence to take into account the fact that commercial potassium hydroxide always contains impurities such as water and potassium carbonate. However, it has now been found that not too great an excess of phenol, and in all cases less than 20 percent, advantageously less than 10 percent, and preferably about 4–5 percent, above the molecular ratio 1:1 of phenol to potassium hydroxide, the maintenance of the melt in a stirrable condition is ensured without any substantial reduction in the yield, especially when a small excess of phenol as indicated above is used. Furthermore, it may be of advantage by raising the temperature above 220° C., for example, to 230° C. and if desired up to about 250° C., and by means of a suitable apparatus to distil off surplus phenol and so diminish the excess present in the final phase of the reaction.

Like advantages, and also other advantages, are obtained by using a melt, which contains equivalent proportions of phenol and potassium hydroxide or advantageously a small excess of phenol as defined above, and which is made up with a comparatively large proportion of water. Such a melt will not enable the high temperatures of about 200–230° C., if desired, up to about 250° C., which are advantageous for the reaction, to be attained directly. However, it has been found that by cautiously distilling off water a sufficient proportion of water can be retained in the melt to keep it in a stirrable condition and to enable the reaction to proceed. In making up a melt it is of advantage in the case of oxidizing agents liable to lead to explosions, for example, a nitrate, perborate or especially chlorate, to add the oxidizing agent in the form of a solution or suspension in water to the melt at a comparatively low temperature. The oxidizing agent then becomes uniformly distributed in the melt and causes no harmful side reactions during this phase of the reaction. There is no difficulty in preparing a melt having a relatively large content of water. For example, a suspension of 1-aminoanthraquinone and pyrolusite in a solution of sodium chlorate may be introduced into an aqueous phenolate melt, or the 1-aminoanthraquinone and the pyrolusite may be added separately before or after the addition of the chlorate solution.

When a melt containing at most a very small excess of phenol is heated to the temperature desired for the reaction so large a quantity of water is evolved in carrying out the process in known manner that the melt loses its stirrability. It has, however, been unexpectedly found that by maintaining a high partial pressure of water vapour above the melt, if desired, coupled with an accurately controlled addition of water to the melt, the water content of the melt can be maintained within the limits desired, so that, on the one hand, the temperature desired for the reaction is attained and, on the other, the melt remains in a stirrable condition. For this purpose for example, the reaction vessel may be provided with a reflux condenser, which is not too large and, if desired, is uncooled or only moderately cooled, and which leads into a descending condenser, in which the greater part of the water is removed. Instead of or in addition to an arrangement of this kind, there may be provided a device for introducing the water into the reaction zone in a controlled manner.

In some cases it may be of advantage to add to the melt a certain amount of an additional substance which may also be present in one of the commercial starting materials, such as potassium carbonate, or which is not normally present therein, such as a chloride or boric acid. Furthermore, it is generally desirable to raise the temperature of the melt gradually, for example to reach the maximum temperature in a period of at least about one hour, because otherwise there is a greater risk of the melt thickening.

The duration of the reaction may be chosen as desired, for example, between about 1 and 7 hours, since the best yield is obtained in a shorter or longer time depending on the temperature used.

Although the procedure described above leads to favorable yields under atmospheric pressure, it may in some cases be desirable to work under superatmospheric pressure, in which case it is necessary, when an excess of water is to be removed, to use an apparatus suitable for this purpose.

In carrying out the process it may be of advantage to control the viscosity of the melt continuously, for example, by measuring the amount of electric energy consumed by the motor driving the stirring mechanism, or by measuring any other value which is in relation to the viscosity of the melt. It is very easy to ascertain at once any increase of the viscosity and to adjust the latter to a value which suits the stirring mechanism, if desired by using an apparatus for automatically adding a controllable quantity of water to the reaction vessel when a certain viscosity value is exceeded. The method of continuously watching the viscosity of the melt is not only the most convenient way of establishing the right amount of distillable liquids in the melt, but practically the only feasible one.

The present process gives excellent yields in a very simple manner without the need of costly fluxing agents. It is especially surprising that water is effective as a liquefying agent at the high temperatures in question, and that it does not impair the reaction. The products can be worked up in the usual manner. If desired, unreacted 1-aminoanthraquinone may be recovered in known manner.

The following examples illustrate the invention, the parts and percentages being by weight unless otherwise stated and the relationship of parts by weight to parts by volume being the same as that of the kilogram to the liter:

*Example 1*

The reaction is carried out in a fusion vessel of nickel having a screwed-on lid and provided with stirring means and a thermometer. The lid has two openings, one of which is larger and is closed by a cover plate which rests loosely in position but provides a good seal, and the second smaller opening is provided with a distillation head in the form of an ascending series of hollow bulbs leading into a descending tube.

150 parts of pure phenol are liquefied by heat with the simultaneous addition of 30 parts of water. There are then added in portions through the larger opening in the lid 100 parts of potassium hydroxide of 88 percent strength, the melt is heated to 150° C. and while continuing the heating, a paste consisting of 100 parts of 1-aminoanthraquinone, 24 parts of sodium chlorate and 35 parts of water, followed by 1 part of pyrolusite, is added in the course of ½ hour. The opening is then closed by means of the cover plate, and the mixture is heated in the course of about ½ hour to an internal temperature of 205–215° C., and the surplus water simultaneously distills through the descending tube. Care must be taken, while maintaining the temperature of 205–215° C., to avoid distilling off so much water that the mass becomes too viscous. If, however, the mass becomes too viscous this can be remedied by cautiously injecting water. The temperature is maintained for 1½ hours. A thin stream of water is then cautiously spread into the reaction mass, while continuously stirring, and the water is immediately taken up while the melt gradually becomes thinner. When the desired degree of thinning has been attained, the melt is poured into a large quantity of water.

The crude dyestuff may be worked up in the usual manner, for example, by filtering the mixture with suction, washing and drying the filter residue, and fractionally crystallizing it from sulfuric acid, or by directly separating the sparingly soluble leuco-compound, which may be produced in the dissolved melt. A very pure dyestuff is obtained in the following manner:

The diluted melt is filtered with suction, the filter residue is washed with hot water, the press cake is dispersed in 3000 parts of warm water and, after the addition of 260 parts of concentrated caustic soda solution and 100 parts of sodium hydrosulfite, the whole is allowed to stand for one hour at 40–45° C. The precipitated sparingly soluble leuco-compound is filtered off with suction, and washed with a dilute solution of caustic soda and hydrosulfite. The filter cake is again dispersed in fresh hot water and oxidized for about 1 hour at 80–90° C., while stirring, with exposure to air. Then the product is again filtered off with suction, washed and dried. A good yield is obtained.

Instead of working in an open vessel, there may be used an apparatus which, after the reagents have been introduced, enables the reaction to be carried out under pressure in such manner that the quantity of water distilling off can be varied as desired.

*Example 2*

1500 parts of phenol (solidification point about 40° C.), 950 parts of potassium hydroxide of 90 percent strength, 100 parts of potassium carbonate, 10 parts of pyrolusite and 1000 parts of 1-aminoanthraquinone of 97 percent strength are mixed together in the apparatus described in Example 1, the mass becoming fused by the spontaneous liberation of heat. There is then added a solution of 180 parts of sodium chlorate in 350 parts of water, and the reaction mixture is heated in the course of 1½ hours to an internal temperature of 210° C. The temperature is then raised at a uniform rate to 225° C. in the course of 1½ hours. Then an internal temperature of 225–235° C. is maintained for a further ½ hour, after which the melt is cautiously diluted with water to about 30,000 parts by volume. The mixture is then boiled for a short time, and the crude dyestuff is filtered off with suction and washed with water. The press cake may then be converted into the leuco-form as described in Example 1, or it may be purified by fractional crystallization from sulfuric acid. The latter method of purification is preferably carried out by dissolving the crude dyestuff in concentrated sulfuric acid, diluting the solution to a concentration of 83–84% with water or dilute acid, and filtering off with suction the product that crystallizes out.

In this manner there is obtained, for example, by purification through the leuco-stage a yield of pure indanthrone of about 70 percent of the theoretical yield calculated on the 1-aminoanthraquinone used as starting material. The 1-amino-anthraquinone which does not enter into reaction can be recovered, when the purification is carried out by way of the leuco-stage, by blowing air through the filtrate obtained from the vatting operation and, when the purification is carried out with sulfuric acid, by diluting the filtrate obtained by filtering off the crystallizate with suction, the best results being obtained by subjecting to sublimation the 1-aminoanthraquinone so obtained.

If the initial mixture described above is prepared with 1100 parts of 1-aminoanthraquinone, instead of 1000 parts, the same yield is obtained calculated on the 1-aminoanthraquinone used.

By using in this example instead of pyrolusite, the same quantity of ferric oxide there is obtained, after purification, in approximately the same yield a dyestuff yielding somewhat more reddish dyeings.

If, in this example, only 150 parts of sodium chlorate are used, instead of 180 parts, and the procedure is the same in other respects, there is obtained in approximately the same yield a dyestuff which likewise yields somewhat more reddish dyeings.

*Example 3*

150 parts of phenol (solidification point about 40° C.), 95 parts of potassium hydroxide of 90 percent strength, 10 parts of potassium carbonate, 100 parts of 1-aminoanthraquinone of 97 percent strength, 1 part of pyrolusite and 18 parts of sodium chlorate are mixed in a fusion vessel and thoroughly fused. The whole is then heated to an internal temperature of about 210° C. in the course of one hour. The temperature is then further raised by maintaining the temperature for successive periods of ½ hour at 210–220° C., at 220–225° C., at 225–230° C., and at 230–240° C., respectively. The mixture is then diluted by the addition of water as described in Example 1 and worked up in the usual manner. The yield corresponds to that given in Example 2.

*Example 4*

1500 parts of phenol (solidification point about 40° C.), 950 parts of potassium hydroxide of 90 percent strength, 100 parts of potassium carbonate, 5 parts of pyrolusite and 500 parts of 1-aminoanthraquinone of 97 percent strength are mixed together in the apparatus described in Example 1, the mass becoming fused by the spontaneous liberation of heat. There is then added a solution of 90 parts of sodium chlorate in 180 parts of water and the reaction is then carried out as described in Example 2. The final dyestuff is obtained in a similar yield as in Example 2.

*Example 5*

1500 parts of phenol (solidification point about 40° C.), 712 parts of potassium hydroxide of 90 percent strength, 170 parts of sodium hydroxide of 98 percent strength, 100 parts of potassium carbonate, 5 parts of pyrolusite and 1000 parts of 1-aminoanthraquinone of 97 percent strength are mixed together in the apparatus described in Example 1, the mass becoming fused by the spontaneous liberation of heat. A solution of 180 parts of sodium chlorate in 360 parts of water is then added and the reaction mixture is heated in the course of 1½ hours to an internal temperature of 210° C. The temperature is then raised at a uniform rate to 225° C. in the course of 1½ hours. Then an internal temperature of 225–235° C. is maintained for a further ½ hour, after which the melt is worked up as described in Example 2. The yield is about the same as described there.

If 475 parts of potassium hydroxide (instead of 712 parts) and 340 parts of sodium hydroxide (instead of 170 parts) are used, there is still obtained a suitable melt, and the reaction proceeds in the same manner, but the yield is somewhat lower.

*Example 6*

1720 parts of o-cresol, 950 parts of potassium hydroxide of 90 percent strength, 100 parts of potassium carbonate, 5 parts of pyrolusite and 1000 parts of 1-aminoanthraquinone of 97 percent strength are mixed together in the apparatus described in Example 1. After a melt has been formed, a solution of 180 parts of sodium chlorate in 360 parts of water is added. Otherwise the reaction is carried out as described in Example 2. The dyestuff is obtained in a somewhat smaller yield than indicated there.

In the above examples sodium chlorate is the preferred oxidizing agent because of its reliable action and good yield of indanthrone. Potassium chlorate may be used as well, care being taken that a suspension of the less soluble potassium chlorate is thoroughly incorporated in the melt. Whereas reaction temperatures of about 200–250° C. are used in the above examples because they usually give good yields it should be understood that higher temperatures up to about 350° C. may be used if desired, although no advantage is at present seen in such higher temperatures. However it is not advisable in general to use temperatures below 200° C. for carrying out the reaction.

Phenol itself is specified in most of the above examples for preparing the alkali metal phenolate melt, because it is cheap and leads to excellent results and there is thus no reason for resorting to alkylphenols like o-, m- or p-cresol. However, if desired, such other phenols may be substituted partly or wholly for the simple phenol specified above (see Example 6).

Potassium phenolate is the preferred alkali metal phenolate because it gives better yields and because it is more reliable in avoiding the risk of the melt thickening. However, it appears from Example 5 that at least about half of the potassium hydroxide used for preparing the alkali metal phenolate may be replaced by sodium hydroxide without undue risk. Since the increased yield obtained with potassium phenolate usually more than outweighs the higher price of potassium hydroxide there is no reason to substitute more than about ⅓ of sodium phenolate for potassium phenolate.

What is claimed is:

1. In a process for the manufacture of vat dyestuffs of the indanthrone series by subjecting a 1-aminoanthraquinone to fusion with a proportion of an alkali metal phenolate of from about 2 to 4 times the weight of the 1-amino-anthraquinone in the presence of an oxidizing agent, the improvement which comprises maintaining in the melt a distillable liquid constituent selected from the group consisting of water and a free phenol in an amount less than 10 percent of the phenol present as alkali metal phenolate and sufficiently high for keeping the melt in a stirrable condition during the whole reaction period.

2. In a process for the manufacture of vat dyestuffs of the indanthrone series by subjecting a 1-aminoanthraquinone to fusion with a proportion of an alkali metal phenolate of from about 2 to 4 times the weight of the 1-aminoanthraquinone in the presence of an oxidizing agent, the improvement which comprises preparing the melt with the addition of water, gradually distilling off water while the melt is heated to a reaction temperature above 200° C., and maintaining in the melt a sufficiently high amount of water during the whole reaction period for keeping the melt in a stirrable condition.

3. A process for the manufacture of indanthrone which comprises subjecting one part of 1-aminoanthraquinone to fusion with about 2 to 3 parts of an alkali metal phenolate in the presence of an oxidizing agent at a reaction temperature above 200° C. while maintaining free phenol in the melt in a concentration of not more than about 5 percent of phenol present as alkali metal phenolate, and water in a concentration sufficiently high for keeping the melt in a stirrable condition during the whole reaction period.

4. A process as claimed in claim 3 wherein the alkali phenolate contains at least a major portion of potassium phenolate.

5. A process as claimed in claim 3 wherein sodium chlorate is used as oxidizing agent and is added as an aqueous solution for preparing the melt.

6. A process as claimed in claim 3 wherein the concentration of the water in the melt for keeping the melt in a stirrable condition is maintained by refluxing part of the water which is distilled off during heating.

7. A process as claimed in claim 3 wherein potassium carbonate is added to the melt.

8. A process as claimed in claim 3 wherein an alkali metal chlorate together with an oxidizing agent selected from the group consisting of manganese dioxide and ferric oxide is used as oxidizing agent.

References Cited in the file of this patent

UNITED STATES PATENTS

| | | |
|---|---|---|
| 1,609,965 | Rogers | Dec. 7, 1926 |
| 1,990,954 | Murch | Feb. 12, 1935 |
| 1,994,484 | Peck et al. | Mar. 19, 1935 |
| 1,997,610 | Thompson | Apr. 16, 1935 |
| 2,693,469 | Thielert et al. | Nov. 2, 1952 |

FOREIGN PATENTS

| | | |
|---|---|---|
| 175,626 | Germany | Oct. 10, 1906 |